(12) United States Patent
Fukuyama et al.

(10) Patent No.: US 6,215,945 B1
(45) Date of Patent: Apr. 10, 2001

(54) OPTICAL FIBER ARRAY

(75) Inventors: Masashi Fukuyama, Komaki; Kazutoshi Tohyama, Nakatsugawa, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/276,298

(22) Filed: Mar. 25, 1999

(30) Foreign Application Priority Data

Mar. 31, 1998 (JP) .................................................. 10-087741
Mar. 8, 1999 (JP) .................................................. 11-060820

(51) Int. Cl.⁷ .................................................. G02B 6/00
(52) U.S. Cl. .................. 385/137; 385/49; 385/89
(58) Field of Search .................. 385/137, 49, 75, 385/88, 89, 92; 359/248; 216/24; 264/1.25

(56) References Cited

U.S. PATENT DOCUMENTS 5,717,803 * 2/1998 Yoneda et al. ........................ 385/89
5,991,492 * 11/1999 Ota et al. ............................ 385/137

* cited by examiner

Primary Examiner—Phan T. H. Palmer
(74) Attorney, Agent, or Firm—Burr & Brown

(57) ABSTRACT

An optical fiber array includes an upper substrate and a lower substrate in which V-shaped grooves are formed, optical fibers being inserted and arranged in the V-shaped grooves. The tips of a plurality of protruding portions formed between the plurality of V-shaped grooves are shaped like planes. The optical fiber array can prevent optical fibers from being damaged or cut while preventing substrates from being cut when the fibers are placed in V-shaped grooves for alignment.

7 Claims, 8 Drawing Sheets

FIG. 12 - Prior Art
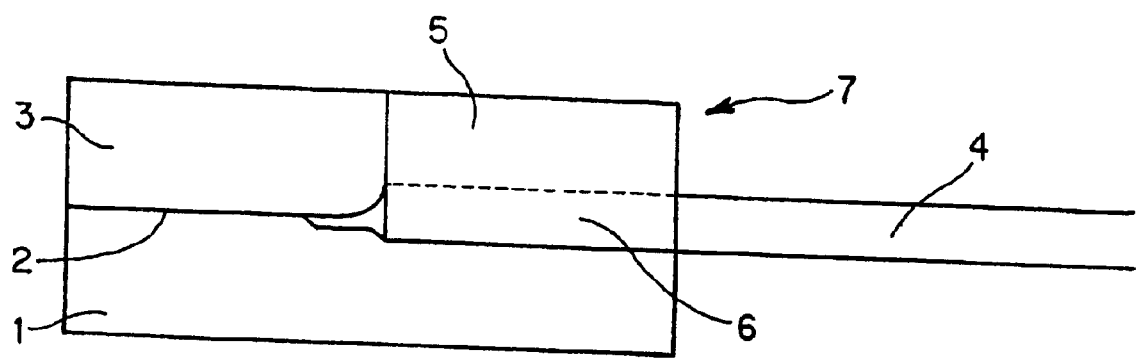

FIG.13 - Prior Art
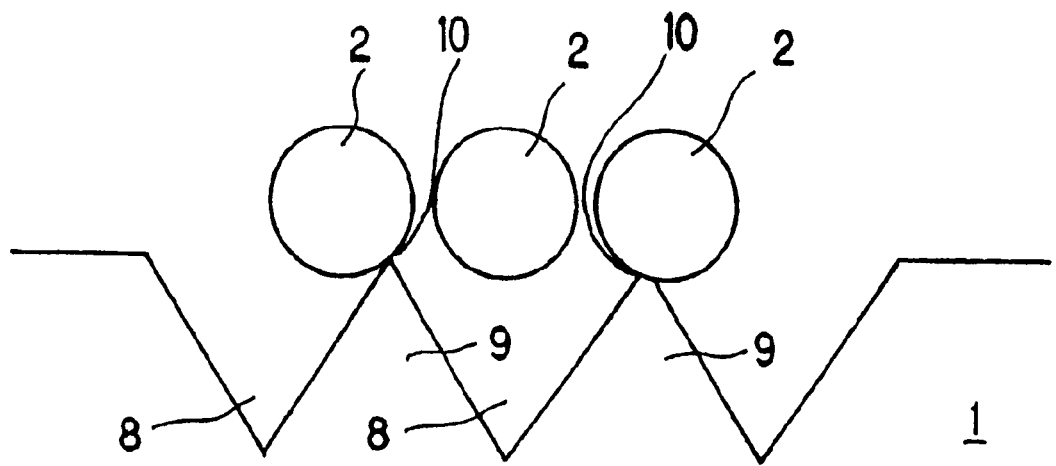

OPTICAL FIBER ARRAY

BACKGROUND OF THE INVENTION AND RELATED STATEMENT

The present invention relates to an optical fiber array in which optical fibers are inserted and arranged in V-shaped grooves.

Due to the increasing density of optical fibers, more and more fibers are used for planar waveguides (PLC). To avoid the increase in size of waveguide elements associated with the increasing number of fibers and to further increase the density, efforts are being made to reduce the conventional standard type waveguide pitch.

FIG. 12 shows an example of a conventional standard optical fiber array. In this figure, an optical fiber array comprises a lower substrate 1 including V-shaped groove in its surface, a fiber presser substrate 3 located over the V-shaped grooves in the lower substrate 1 to press non-covered (bare) optical fibers 2 in the V-shaped grooves, and a covered fiber housing substrate 5 that presses covered optical fibers 4. Covered optical fibers 4 are inserted through a covered housing groove 6 formed in the covered fiber housing substrate 5 so that bare optical fibers 2 are aligned in the V-shaped grooves, thereby constituting the optical fiber array 7.

The optical fiber array is configured as described above, and a normal method for aligning and fixing the optical fibers 2 to the lower substrate 1 is to place cores of the bare optical fibers 2 in the V-shaped grooves from above, to place the fiber presser substrate 3 thereon, and to use an adhesive to fix the fibers. In this case, as shown in FIG. 13, when the optical fibers 2 are placed in the V-shaped grooves 8, they may collide against the tip edges 10 of protruding portions 9 formed between the plurality of V-shaped grooves 8 and may be damaged or cut, resulting in an open circuit. In addition, the tip edges 10 of the protruding portions 9 in the lower substrate may also be cut to cause an open circuit or an insufficient fiber arrangement accuracy.

In addition, if, for example, the optical fiber array is used for a fiber core selection apparatus, the fibers may be moved among the plurality of V-shaped grooves in the lower substrate.

When the fibers are moved among the V-shaped grooves in this manner, similarly as the above description the fibers 2 may be damaged or cut or the tip edges 10 in itself of the protruding portions 9 each formed between the V-shaped grooves 8 may be cut to cause an open circuit or an insufficient fiber arrangement accuracy.

SUMMARY OF THE INVENTION

The present invention has been achieved in view of the conventional problem, and its object is to provide an optical fiber array that can prevent optical fibers from being damaged or cut while preventing substrates from being cut when the fibers are placed in V-shaped grooves for alignment.

This invention also provides an optical fiber array wherein if fibers are moved from one V-shaped groove to its adjacent V-shaped groove as in a fiber core selection apparatus, they can be easily moved and are prevented from being damaged or cut while the substrates are prevented from being cut.

According to this invention, this object can be attained by an optical fiber array comprising an upper substrate and a lower substrate in which V-shaped grooves are formed, optical fibers being inserted and arranged in the V-shaped grooves, wherein the tips of a plurality of protruding portions formed between the plurality of V-shaped grooves are shaped like planes.

In the optical fiber array according to this invention, the tips of the plurality of protruding portions are preferably located at the same height, and a lower substrate is formed so that its top surface is located higher than the tips of the plurality of protruding portions.

In addition, if a flat portion is formed outside the V-shaped groove at each end, a step is preferably provided between the flat portion and the top surface of the lower substrate, and the tips of the plurality of protruding portions and the flat portion are more preferably located at the same height. The structure of this invention is preferably applicable if the fibers are moved from one V-shaped groove to its adjacent V-shaped groove.

Furthermore, if the lower substrate has on the respective sides of the plurality of V-shaped grooves, guide fixing grooves into which a guide pin is inserted, planar portions are preferably provided on the respective sides of the guide fixing grooves.

BRIEF DESCRIPTION OF THE DRAWINGS

FIG. 12 is a front view showing an example of a conventional standard optical fiber array.

FIG. 13 is an explanatory drawing showing an example of a lower substrate having conventional V-shaped grooves.

DETAILED DESCRIPTION OF PREFERRED EMBODIMENT

Embodiments of this invention will be described with reference to the drawings.

Figure 1:
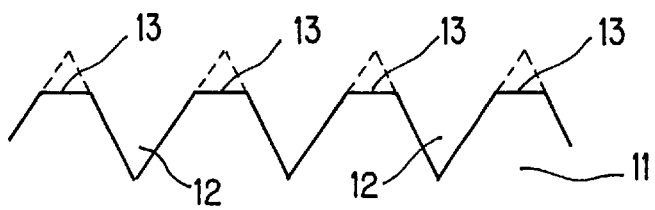
FIG. 1 is an explanatory drawing showing an example of a lower substrate used for an optical fiber array according to this invention.

FIG. 1 is an explanatory drawing showing an example of a lower substrate used for an optical fiber array according to this invention. A plurality of V-shaped grooves 12 are formed in the surface of the lower substrate 11, and the tips 13 of a plurality of protruding portions formed between the plurality of V-shaped grooves 12 are formed like planes.

Since the tips 13 of the protruding portions each located between the V-shaped grooves 12 are formed like planes, if optical fibers collide against the tips 13 of the protruding portions when they are placed and aligned in the V-shaped grooves 12, the non-sharpened shape of the tips 13 of the protruding portions prevents the fibers from being damaged or cut and also prevents the lower substrate 11 from being cut.

In addition, when the tips 13 of the plurality of protruding portions are formed at the same height, the plurality of fibers can be evenly positioned and aligned in the V-shaped grooves 12so as not to be biased. Consequently, when an adhesive is used for fixation, the thickness of the adhesive is constant and the distribution of stress caused by the hardening and contraction or thermal expansion of the adhesive is uniform, so very stable quality can be preferably achieved. If the distribution of stress is not uniform, the fibers may be partly peeled off or the quality may be degraded.

Figure 11:
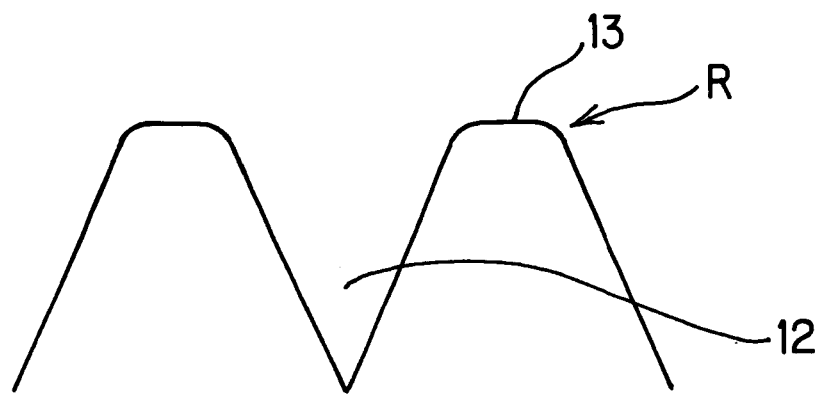
FIG. 11 is an explanatory drawing showing another example of the slopes of V-shaped grooves in a lower substrate and the tips of protruding portions in an optical fiber array according to this invention.

In this case, the edge between the flat tip 13 of the protruding portion and the slope of the V-shaped groove 12 is more preferably curved as shown in FIG. 11.

That is, by curving the boundary portion between the slope of the V-shaped groove 12 and the flat tip 13 of the protruding portion as shown in FIG. 11, the lower substrate 11 and the fibers are effectively prevented from being cut. This curve, however, must be shaped so as not to affect the contact between the fibers and the V-shaped grooves 12 and must be sized to allow the flat portions each located between the V-shaped grooves 12 to function properly. For example, the curve must be sized so as not to reach the position at which the fiber and the V-shaped groove 12 contact each other, so that the fiber does not abut on the curve. In addition, if the fiber contact portion is located at the boundary portion (the fiber abuts on the curve), the curves must have the same shape within a group of a number of V-shaped grooves in order to maintain a fiber arrangement accuracy.

Figure 2:
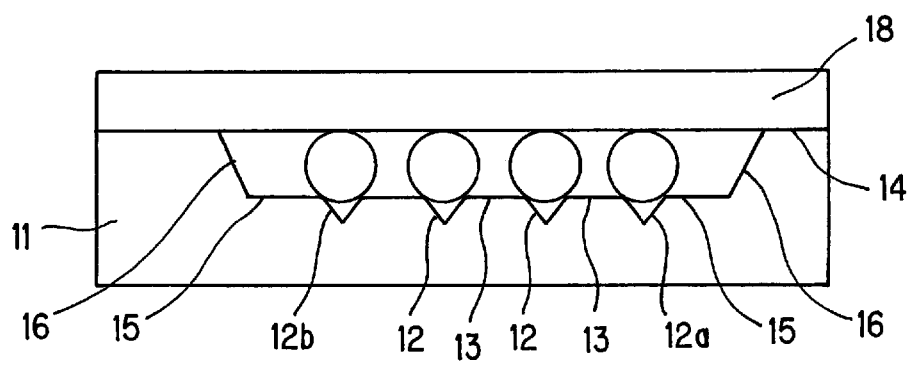
FIG. 2 is an explanatory drawing showing another example of a lower substrate used for an optical fiber array according to this invention.

FIG. 2 is an explanatory drawing showing another example of a lower substrate used for the optical fiber array according to this invention. As in FIG. 1, the plurality of V-shaped grooves 12 are formed in the surface of the lower substrate 11, and the tips 13 of the plurality of protruding portions formed between the plurality of V-shaped grooves 12 are formed like planes. According to the embodiment of FIG. 2, the lower substrate 11 is formed so that its top surface 14 is located higher than the tips 13 of the plurality of protruding portions, and a flat portion 15 is provided outside each of the V-shaped grooves 12a and 12b at the respective ends to form a step 16 between the flat portion 15 and the top surface 14 of the lower substrate 11. Reference numeral 18 designates an upper substrate.

The structure having the step between the flat portion and the top surface of the lower substrate will be described in detail.

Figure 3:
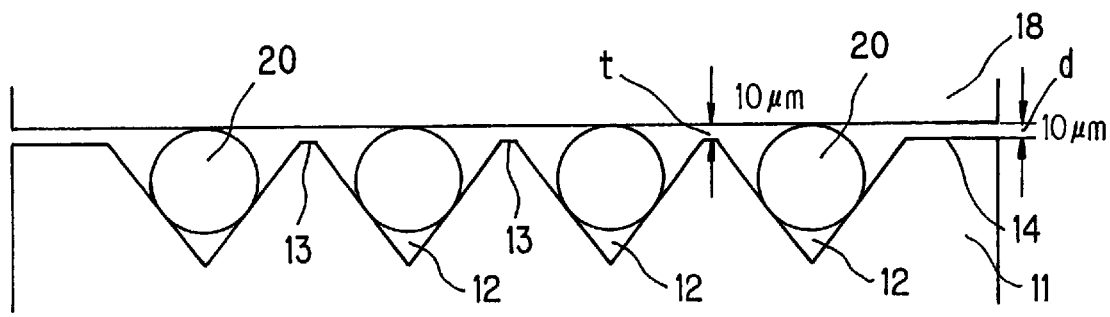
FIG. 3 is an explanatory drawing showing an example of a fiber optical array structure in which the heads of fibers are located higher than the top surface of the lower substrate, according to this invention.

To achieve reliability, optical fiber arrays using an adhesive for fixation normally have respective appropriate adhesive-layer thicknesses depending on the type of the selected adhesive. Thus, when the lower substrate of the V-shaped groove structure shown in FIG. 1 is used to form a structure in which the heads of the fibers are located higher than the top surface of the lower substrate, the gap (d) between the top surface 14 of the lower substrate 11 and the bottom surface of an upper substrate (a fiber presser substrate) 18 is identical to the thickness (t) of an adhesive layer (the distance between the tip 13 of the protruding portion of the V-shaped groove 12 and the bottom surface of the upper substrate 18) as shown in FIG. 3. In the embodiment in FIG. 3, the thickness of the adhesive layer is 10 $\mu$m, but in this case, the thickness of part of the adhesive layer that contacts the atmosphere on the side is the same as the internal thickness, that is, 10 $\mu$m. As a result, moisture from the atmosphere permeates through the gap (d) to reduce reliability over time.

Figure 4:
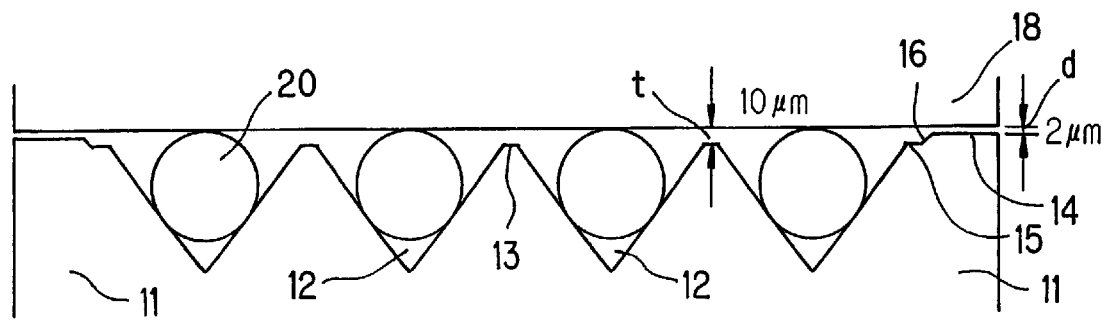
FIG. 4 is an explanatory drawing showing another example of a fiber optical array structure in which the heads of fibers are located higher than the top surface of the lower substrate, according to this invention.

On the contrary, if the lower substrate is used that is shown in FIGS. 2 and 4 showing the structure in which the step 16 is provided between the flat portion 15 and the top surface 14 of the lower substrate 11, the size of the gap (d) between the top surface 14 of the lower substrate 11 and the upper substrate 18 can be reduced below the thickness (t) of the adhesive layer to minimize the permeation of moisture from the atmosphere while enabling the adhesive layer over the V-shaped grooves to be formed to have a desired thickness (t), resulting in longtime reliability.

In order to minimize the permeation of moisture, this embodiment sets the thickness of the internal adhesive layer at 10 $\mu$m and the thickness of the adhesive layer on the side (the interval between the top surface of the lower substrate and fiber presser substrate) at 2 $\mu$m.

Figure 5:
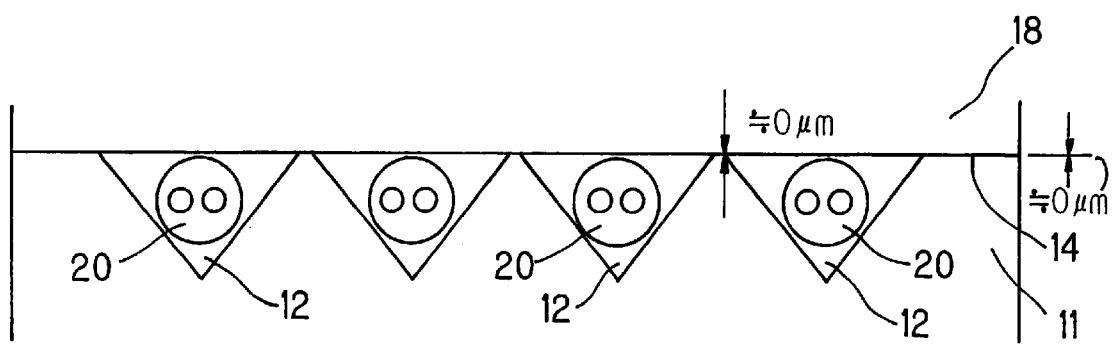
FIG. 5 is an explanatory drawing showing an example of a fiber optical array structure in which the heads of fibers are located lower than the top surface of the lower substrate, according to this invention.

In addition, the lower substrate of the V-shaped structure shown in FIG. 1 may preclude an appropriate adhesive-layer thickness (t) from being obtained depending on the type of the fibers used. That is, if polarization fibers are used and the upper substrate (fiber presser substrate) 18 is used to press fibers 20 as shown in FIG. 3, stress may be generated to degrade polarization cross talks, so in some cases, the polarization fibers 20 are hidden inside the V-shaped grooves 12 (the heads of the fibers 20 are lower than the top surface 14 of the lower substrate 11) as shown in FIG. 5.

Figure 6:
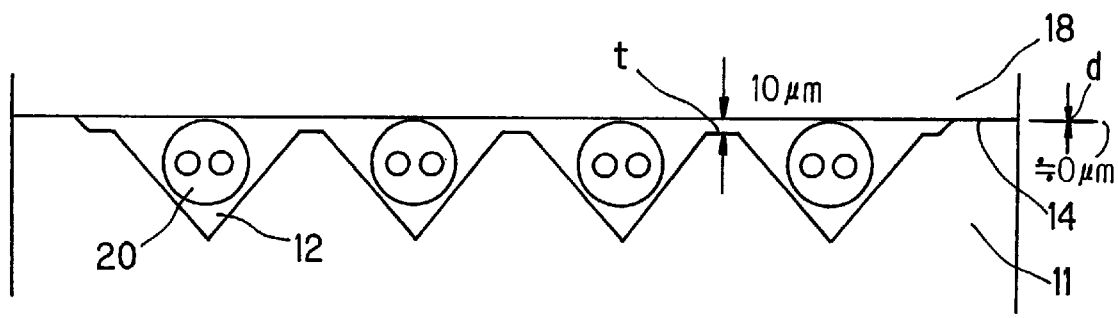
FIG. 6 is an explanatory drawing showing another example of a fiber optical array structure in which the heads of fibers are located lower than the top surface of the lower substrate, according to this invention.

In this case, however, the adhesive-layer thickness (t) is almost zero, so the appropriate adhesive thickness cannot be obtained. Thus, if the step is provided between the flat portion and the top surface of the lower substrate, then, as shown in FIG. 6, the polarization fibers 20 can be hidden inside the V-shaped grooves 12 to preclude the fiber presser substrate 18 from abutting on the polarization fibers 20 in order to prevent stress, thereby providing a desired adhesive-layer thickness, for example, 10 $\mu$m. In this case, the gap (d) (that is, the adhesive-layer thickness) between the top surface 14 of the lower substrate 11 and the bottom surface of the upper substrate 18 is small and may be almost zero, so the permeation of moisture through this portion can be minimized while the desired adhesive-layer thickness (t) can be obtained, resulting in high longtime reliability.

Figure 7:
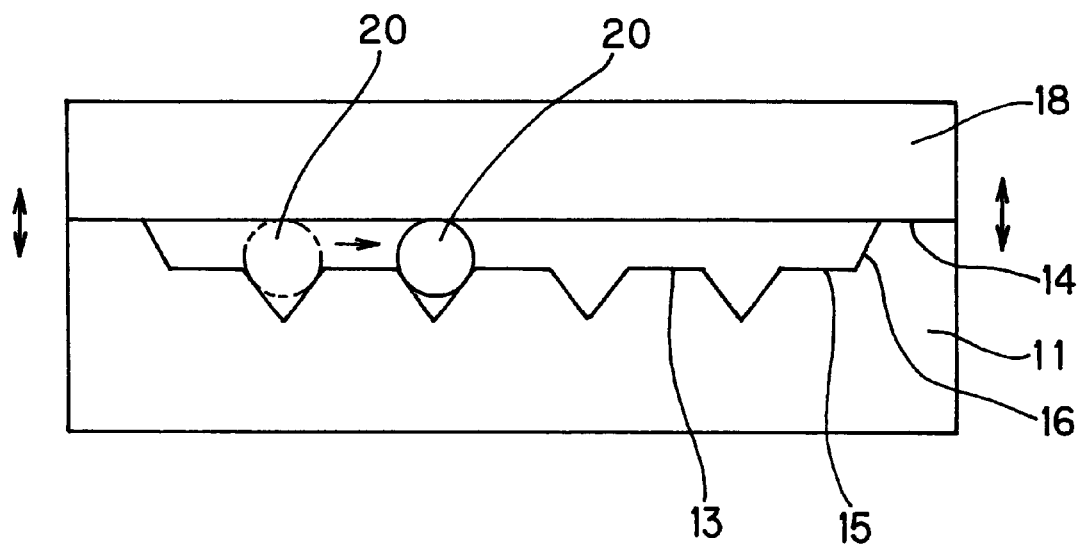
FIG. 7 is an explanatory drawing showing another example of an optical fiber array according to this invention.

In addition, in, for example, a fiber core selection apparatus, a lower substrate of a multicore V-shaped-groove structure is used to move the fibers from one V-shaped groove to its adjacent V-shaped groove. In such a case, by using the structure with the step provided between the flat portion and the top surface of the lower substrate and forming the tips 13 of the protruding portions so as to be planar and low as shown in FIG. 7, the amount of upward movement of the fibers is reduced that is required in moving the fibers upward to expose the entire fibers outside the V-shaped groove and then moving them sideward, thereby enabling the fibers 20 to be moved to the adjacent V-shaped grooves easily. Besides, the step 16 is provided between the flat portion 15 and the top surface 14 of the lower substrate 11 to allow the fibers 20 to be fixed easily.

Figure 8:
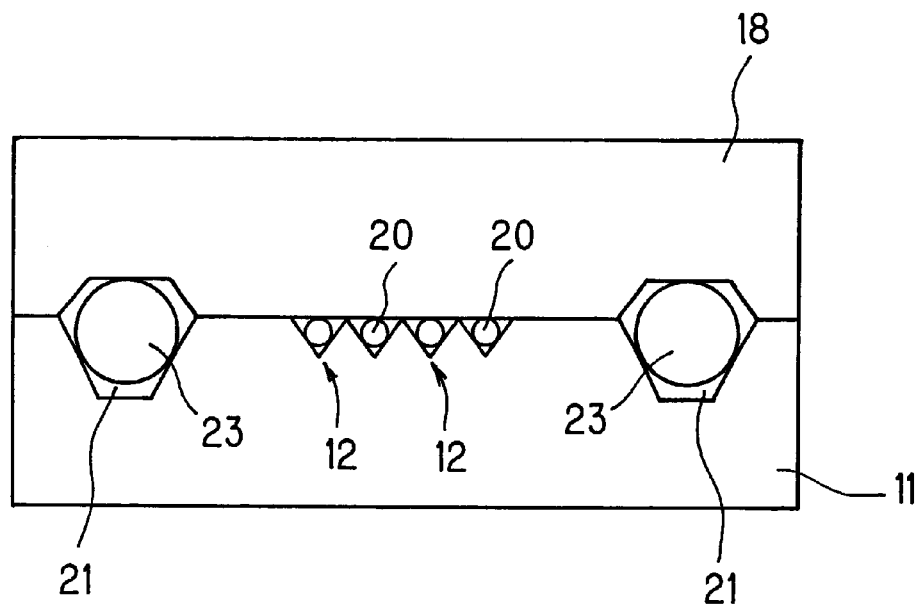
FIG. 8 is an explanatory drawing showing an example of an optical fiber array including guide fixing grooves.

FIG. 8 is a schematic sectional view showing an example of an optical fiber array structured to have a guide fixing groove.

As shown in FIG. 8, in an optical fiber array in which guide fixing grooves 21 through which a guide pin 23 is inserted are provided on the respective sides of the plurality of V-shaped grooves 12 with the optical fibers 20 inserted and arranged therein, the amount of adhesive applied and the environment including the temperature must be strictly controlled to prevent the adhesive from infiltrating into the guide fixing grooves 21.

Figure 9:
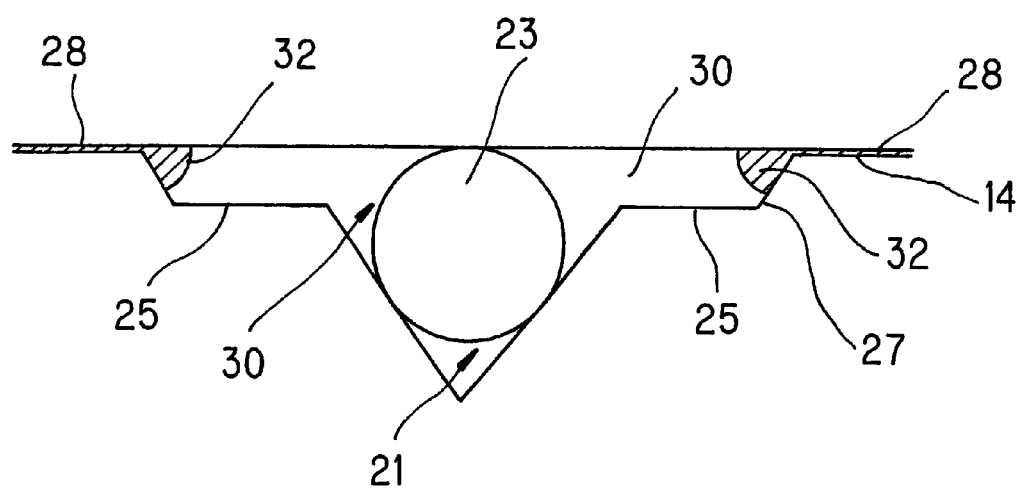
FIG. 9 is an enlarged explanatory drawing showing a portion of the optical fiber array including the guide fixing groove.

Thus, in the optical fiber array of the above structure, planar portions 25 are provided on the respective sides of the guide fixing groove 21 and a step 27 is provided between the lower substrate 11 and the top surface 14 in order to form a space 30 between the guide fixing groove 21 and an adhering portion 28 between the upper and lower substrates 18 and 11, as shown in FIG. 9. Consequently, an extra adhesive 32 overflowing the adhering portion 28 is collected in the space 30 and is thus prevented from infiltrating into the guide fixing groove 21 or hindering the movement of the guide pin 23. Besides, this structure does not require the minor adjustment of the amount of adhesive, thereby enabling a stable adhesion.

Although in the above example, the V-shaped grooves 12 for fixing the optical fibers have a V-shaped cross section, they are not limited to this aspect and may have a U-shaped or a trapezoidal cross section. In addition, although the guide fixing grooves 21 have a trapezoidal cross section in FIG. 8 or a V-shaped cross section in FIG. 9, they are not limited to this aspect and may have a U-shaped cross section.

A method for producing the lower substrate used in this invention will be described.

The upper and lower substrates constituting the optical fiber array are formed of a glass or plastic material through which light is transmitted, but the glass material is preferable judging from the view point of preferable light transmittance and small thermal expansion.

Cutting work or press molding (reheat press molding) can be used to produce a lower substrate having V-shaped grooves and surfaces of the specific structures according to this invention by using glass material.

For cutting work, a glass material that has been cut into a certain size is fixed to a grinder and V-shaped grooves are cut into the surface. Subsequently, flat portions are formed using a surface grinding machine. This method may be executed prior to the formation of the V-shaped grooves. An optical fiber covering housing section (a spot-faced portion) is formed to be linear using cutting work. Alternatively, a recessed shape is produced using ultrasonic machining.

In addition, press molding is executed using a glass material that has been cut into an arbitrary size and a mold with a V-shaped protruding portion to transfer a V shape to the glass material. A spot-faced portion is produced as in the above cutting work.

Figure 10:
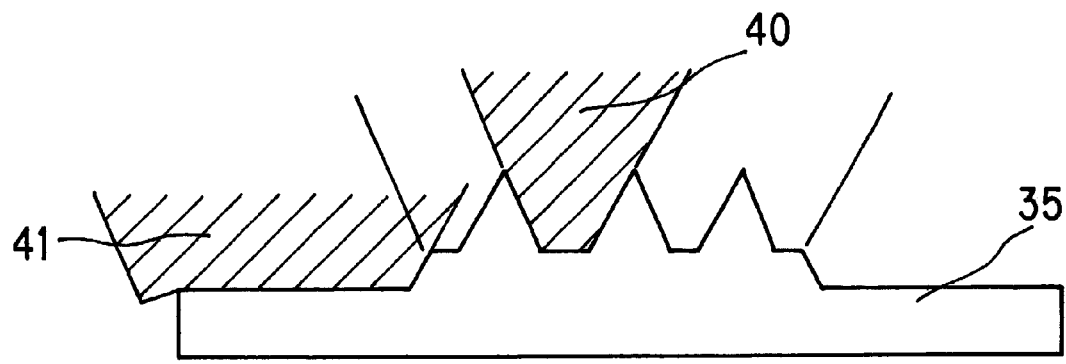
FIG. 10 is an explanatory drawing showing an example in which a mold is produced.

V-shaped grooves in a lower substrate, the tips of protruding portions each formed between the V-shaped grooves in the lower substrate, and molding surfaces corresponding to steps are formed in a mold 35 having a predetermined molding surface, by means of cutting work using trapezoidal grindstones 40 and 41, as shown in FIG. 10.

Specifically, a slicer was used to produce the mold. The grindstone 40 comprised a diamond grindstone. The grindstone was trapezoidal and had an angle of 70 ° and a 0.05-mm plane at its tip. This grindstone 40 was used to cut five rows of V-shaped grooves spaced at an equal interval of 0.25 mm and having the same depth of 0.2 mm. The grooves obtained each had a plane at its bottom and had V-shaped protrusions each formed between the grooves.

Then, the trapezoidal grindstone 41 having an angle of 70° and a 2.0-mm plane was positioned so as to cut a slope outside each of the first and fifth rows of V-shaped protrusions formed by means of the cutting work using the grindstone 40. The cutting work was carried out so that the bottom of the slope was deeper than the bottom plane of the groove cut by the grindstone 40, by 0.01 m. Thus, a mold 35 was produced that had the molding surface shape shown in FIG. 10.

In a molding obtained by means of glass press molding using this mold, the part cut by the grindstone 40 became the V-shaped grooves in the fiber array lower substrate while the part cut by the grindstone 41 became the top surface of the fiber array lower substrate. Then, the shape such as the step 16 in FIG. 4 was formed in the boundary between the V-shaped grooves and the top surface of the fiber array lower substrate.

As described above, the optical fiber array according to this invention can prevent the optical fibers from being damaged or cut while preventing the substrates from being cut when the optical fibers are placed and aligned in the V-shaped grooves.

In addition, if the fibers are moved from one V-shaped groove to its adjacent V-shaped groove as in a fiber core selection apparatus, the fibers can be easily moved without damaging or cutting the fibers or cutting the substrates.

What is claimed is:

1. An optical fiber array comprising an upper substrate and a lower substrate a plurality of V-shaped grooves being formed in said lower substrate, optical fibers being positioned in the V-shaped grooves, tips of a plurality of protruding portions formed between V-shaped grooves being shaped like planes, said lower substrate being formed so that a top surface of said lower substrate is located higher than said tips of said plurality of protruding portions.

2. The optical fiber array according to claim 1 wherein a flat portion is formed outside the V-shaped groove at each end of said lower substrate, and wherein a step is provided between each said flat portion and said top surface of the lower substrate.

3. The optical fiber array according to claim 2 wherein the tips of each said plurality of protruding portions and the flat portion are located at the same height.

4. The optical fiber array according to claim 2 wherein said lower substrate has a shape which defines means for allowing movement of an optical fiber from said first V-shaped groove to said second V-shaped groove.

5. The optical fiber array according to claim 1 wherein the lower substrate has on the respective sides of the plurality of V-shaped grooves, guide fixing grooves into which a guide pin is inserted, and wherein planar portions are provided on the respective sides of the guide fixing grooves.

6. The optical fiber array according to claim 5, wherein said upper substrate has guide fixing grooves which correspond to said guide fixing grooves in said lower substrate.

7. The optical fiber array according to claim 5, wherein said guide pin has a cross-sectional dimension which exceeds a depth of said guide fixing grooves in said lower substrate.

* * * * *